Mar. 27, 1923.
1,449,524
H. E. McHUGH ET AL
SPRING SUSPENSION FOR VEHICLES
Filed Feb. 1, 1922
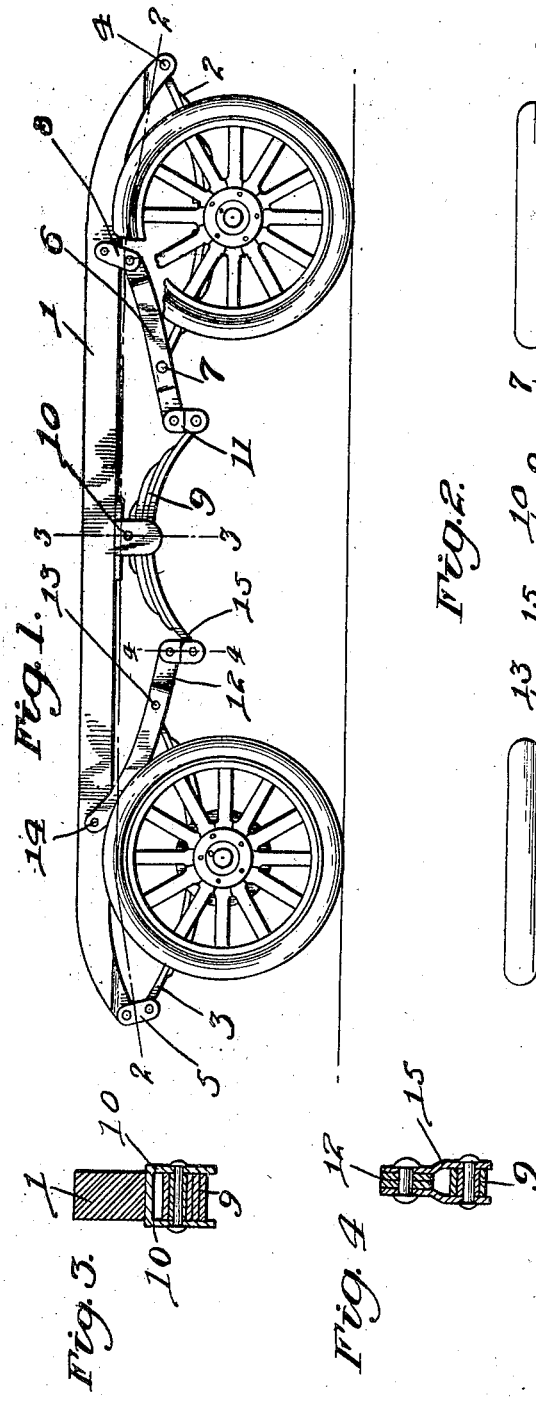
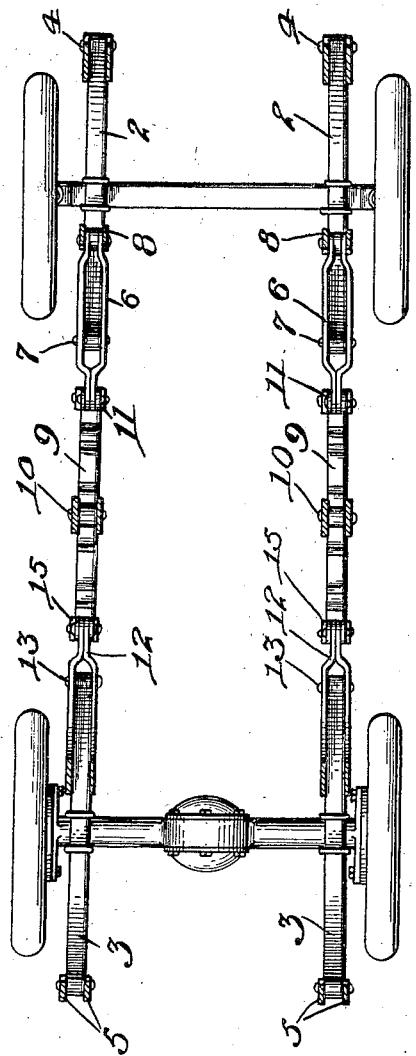
George M. Kelsey.
Harry E. McHugh.
Inventors.
By William C. Linton
Attorney.

Patented Mar. 27, 1923.

1,449,524

UNITED STATES PATENT OFFICE.

HARRY E. McHUGH, OF DEVILS LAKE, AND GEORGE M. KELSEY, OF GRAND FORKS, NORTH DAKOTA.

SPRING SUSPENSION FOR VEHICLES.

Application filed February 1, 1922. Serial No. 533,458.

*To all whom it may concern:*

Be it known that we, HARRY E. McHUGH and GEORGE M. KELSEY, a citizen of the United States of America, and subject of the King of Great Britain, respectively, residing at Devils Lake, Ramsey County, and Grand Forks, Grand Forks County, North Dakota, respectively, have invented certain new and useful Improvements in Spring Suspensions for Vehicles; and we do hereby declare that the following is a full, clear, concise, and exact description of the invention, such as will enable others skilled in the art to which it appertains to make and use the same.

This invention relates to improvements in vehicle spring suspension devices particularly to that type of device described and claimed in the United States patent granted to George M. Kelsey and numbered 1,391,-192, having for an object to provide a spring suspension for motor driven vehicles wherein drive from the power source of such vehicles is transmitted through the rear springs of the vehicle to the several rear or driving wheels, one of the well known and prevalent types of such driving mechanisms being identified in the trade "Hotchkiss drive," affording means for assuring the equal distribution of shock or other stress throughout the active elements of the invention and permitting of but a minimum amount of rebound of the spring means during their reactive movement, thus rendering a vehicle, so equipped, easy riding and allowing the chassis as well as the body of such a vehicle to remain in a substantially level position during its travel over a rough or uneven surface, avoiding the necessity of employing such accessories as shock absorbing and so termed "snubbing" devices which serve to additionally absorb shock or stress and prevent undue vibration by reason of rebound of the vehicle springs proper together in some instances, with the shock absorbing devices.

It is likewise an object of the invention to provide means for diffusing and absorbing abnormal stress imparted to the rear springs because of the excessive torque action of the driving shaft, at times, during operation of the vehicle, hence, preventing any detrimental results therefrom upon the driving axles or their several connections with the rear or driving wheels.

Other objects will be in part obvious and in part pointed out hereinafter.

In order that the invention and its mode of operation may be readily understood by persons skilled in the art, we have in the accompanying illustrative drawings and in the detailed following description based thereon, set out one possible embodiment of the invention.

In these drawings:—

Figure 1 is a side elevation of a vehicle equipped with the improved spring suspension means;

Figure 2 is a horizontal section taken on the line 2—2 of Figure 1;

Figure 3 is a vertical section in detail taken on the line 3—3 of Figure 1; and, Figure 4 is a similar section in detail taken on the line 4—4 of Figure 1.

Having more particular reference to the drawings, in connection with which like characters of reference will designate corresponding parts throughout, 1 represents the chassis of a vehicle provided with the invention, said chassis having horns or downwardly curved portions formed on its opposite ends whereby to permit of connection of the outer ends of semi-elliptical leaf springs 2 and 3 thereto, the connection of the forward springs 2 being directly to the adjacent ends of the horns upon the forward portion of the chassis 1 as indicated at 4, while the outer ends of the rear springs 3 are pivotally connected through shackles 4 to the adjacent ends of the horn upon the rear end of the chassis, as indicated at 5. In this invention, we propose to provide what may be aptly termed as a boating or movable connection between the inner ends of the semi-elliptical springs 2 and 3 and the chassis frame 1, said connection as regards the forward springs 2 being effected through the medium of levers 6, formed of suitable metal and having their intermediate portions enlarged and formed with longitudinal ways for receiving the adjacent inner ends of said springs 2 therebetween and permitting of pivotal connection of said springs to the intermediate portions or in the ways provided in said levers 6 as indicated at 7. In this connection, it is to be noted that the outer ends of the several levers 6 are pivotally connected to the forward portions of the opposite sides of the chassis 1 through the medium of shackles 8, while the respective connections of the inner ends of the forward semi-elliptical springs 2 with said levers 6 occur at points intermediate their ends as clearly shown in the Figures 1 and 2.

Pivotally connected to and suspended from the lower sides of each of the opposite sides of the chassis 1 are semi-elliptical and downwardly disposed leaf springs 9, said springs as will be noted, upon reference to the Figure 1, having pivotal connection with the intermediate portions of the chassis sides through the medium of bracket arms 10, the upper portions of which are firmly secured to the lower faces of the intermediate portions of said chassis sides, while the lower portions thereof receive between the same, the intermediate portions of said downwardly disposed semi-elliptical leaf springs 9. Certain of the ends of these springs 9, which, as will be noted, are arranged in substantially parallel relation with respect to their several chassis sides are extended into proximity to the free or inner ends of the levers 6 and to effect movable connection as between said ends of the springs 9 and the levers 6, shackles 11 are employed, and as will be understood, have pivotal connection with the adjacent portions of such elements.

The inner or free ends of the rearward semi-elliptical springs 3 are likewise connected to levers 12, intermediate their ends, as indicated at 13, said levers 12 having their rearward ends pivoted directly to adjacent portions of the opposite sides of the chassis 1, as at 14, while their intermediate portions are enlarged and provided with ways as are the levers 6, whereby to permit the pivotal connection, at 13, of the adjacent ends of the rearward springs 3, between the same; the inner or free ends of the levers 12 being pivotally connected to the adjacent ends of the semi-elliptical downwardly disposed leaf springs 9 through the medium of shackles 15, as are the opposite ends of said springs.

From the foregoing, it will be understood that we have provided a novel form of spring suspension for motor driven vehicles which will be found especially advantageous for use in connection with those vehicles of the spring drive type, such as the "Hotchkiss" and trade identified arrangements now prevalent in the art. The arrangement is such as with application of abnormal stress to any of the wheels, either the rear or forward ones, the particular springs to which the same are directly related will be flexed and by consequence, will have their inner ends moved, thus effecting pivotal movement of the particular lever either 6 or 12 connected thereto and causing movement of the inner end of said lever with respect to the particular downwardly disposed leaf spring 9 receiving the same. With such movement of the lever, either 6 or 12, its force will be transmitted to the pivotal or oscillatory leaf spring 9 and in turn, will be partially absorbed thereby when the upwardly moving portion thereof abuts an adjacent portion of the bracket 10, a portion of said force being transmitted to the opposite lever pivoted to the corresponding side of the vehicle chassis. By this transmission and resultant absorption of the abnormal stress imparted to the vehicle wheel, it will be understood that excessive vibration of the chassis will be prevented and furthermore, rebound of the springs during those periods of reaction of the particular rearward or forward springs supporting the wheel receiving such stress will be reduced to the minimum, inasmuch as the return pivotal movement of the lever connected thereto will be checked and limited by reason of its connection with the shock absorbing and diffusing spring 9. Also, because of the floating connection as between said rearward and forward springs 2 and 3 and the chassis 1, it will be understood that the same will be provided with a materially greater degree of resiliency and shock absorbing efficiency. Likewise, with the transmission of abnormal stress, such as by excessive torque upon the driving shaft of the vehicle to the rearward or driving wheels, the springs 3 supporting the same when flexed, will have their floating ends moved to impart motion to the pivotal levers 12, which in turn, will transmit the stress to the absorbing springs 9 for diffusion throughout the spring suspension means. Thus, any detrimental results occurring from such conditions upon the active parts of the vehicle will be prevented to a large degree.

While we have hereinbefore described with some degree of particularity certain adaptions of our invention, it is to be understood that its mode of application may be widely varied, such as conditions or preference may dictate; for example, the arrangement may be equally well used upon those designs of vehicles which do not use a Hotchkiss drive, that is, drive through the springs nor employ a torque arm but carry their drive upon the torque tube. In other designs of motor vehicles, in order to relieve the torque tube of stress, torque arms are employed in addition to the torque tube, or if not this, the torque tube is left free. Thus, it will be understood that the invention may be equally well used upon self propelled vehicles employing torque tubes or torque arms to carry the driving thrust commonly termed "torque".

Manifestly, the construction shown is capable of considerable modification and such modification as is within the scope of our claims, we consider within the spirit of our invention.

We claim:

1. The combination with the semi-elliptical supporting springs of a vehicle chassis, the adjacent ends of which are free, of levers pivoted to said chassis adjacent the forward and rearward portions of the opposite sides thereof and extending beyond the arrangement of the inner ends of said springs with relation to the chassis, said levers having pivotal connection with the adjacent ends of the springs, and shock absorbing means pivotally connected to the free ends of said levers and mounted upon the opposite sides of the vehicle chassis, intermediately of said free ends of the levers.

2. The combination with the semi-elliptical supporting springs of a vehicle chassis, the adjacent ends of which are free, of a pair of curved levers arranged in proximity to the forward portions of the opposite sides of the chassis, shackles for connecting certain of the ends of said levers to the opposite sides of the chassis at points outwardly of the arrangement of the adjacent ends of the semi-elliptical springs with relation to the chassis, the intermediate portions of said levers being pivotally connected to said free ends of certain of the springs, another pair of curved levers pivotally connected to the rearward portions of the opposite sides of the vehicle chassis, at points outwardly of the arrangement of the free ends of the remaining semi-elliptical springs with relation thereto, said last mentioned levers being pivotally connected to the adjacent ends of the remaining springs, intermediate their ends, and shock absorbing means supported upon the opposite sides of the vehicle chassis intermediately of the free ends of each of said pairs of levers and pivotally connected to the same.

3. The combination with the semi-elliptical supporting springs of a vehicle chassis, the adjacent ends of which are free, of curved levers disposed longitudinally of the opposite sides of the vehicle chassis and pivotally connected at certain of their ends with the forward and rearward adjacent portions of the opposite sides of the chassis at points outwardly of the relative arrangement of the adjacent free ends of the spring to the chassis, the intermediate portions of said levers being pivotally connected to the adjacent free ends of said springs, and longitudinally disposed shock absorbing means secured to said opposite sides of the chassis and pivotally connected adjacent their opposite ends to the free or adjacent ends of said levers.

4. The combination with the semi-elliptical supporting springs of a vehicle chassis, the adjacent ends of which are free, of a pair of curved levers arranged in proximity to the forward portions of the opposite sides of said chassis and disposed longitudinally of the same, certain of the ends of said levers being pivoted to adjacent portions of the sides of the vehicle chassis at points outwardly of the relative arrangement of the adjacent free ends of certain of said springs to the chassis, the intermediate portions of said levers having pivotal connection with the free ends of said last mentioned springs, another pair of curved levers arranged in proximity to the rearward portions of the opposite sides of the vehicle chassis and disposed longitudinally of the same, shackles for movably connecting certain of the ends of said last mentioned levers to adjacent rearward portions of the opposite sides of the chassis, said last mentioned levers having pivotal connection intermediate their ends with the adjacent free ends of the remaining semi-elliptical springs, and longitudinally arranged, downwardly disposed semi-elliptical springs pivotally supported for limited movement upon the opposite sides of the vehicle chassis, intermediately of the free ends of said pairs of levers and pivotally connected at their opposite ends to the adjacent ends of said levers.

In witness whereof we have hereunto set our hands.

HARRY E. McHUGH.
GEORGE M. KELSEY.